Patented Dec. 2, 1947

2,431,910

UNITED STATES PATENT OFFICE 2,431,910

N-NAPHTHYL ACETAMIDOMETHYL NAPHTHOLS

Elkan R. Blout, Cambridge, and Richard S. Corley, Boston, Mass., assignors to Polaroid Corporation, Cambridge, Mass., a corporation of Delaware No Drawing. Application September 9, 1946, Serial No. 695,821

3 Claims. (Cl. 260—562)

This invention relates to organic chemical compounds and is directed to a new compound of the Mannich base type.

By this invention there are provided new compounds, namely N-acetyl-1-(2'-naphthylaminomethyl)-2-naphthols which may be represented by the following formula:

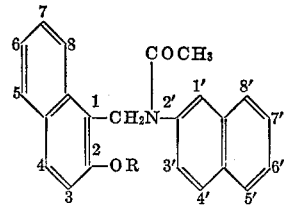

wherein R may be H or $COCH_3$.

In the above formula when R represents hydrogen the compound is N-acetyl-1-(2'-naphthylaminomethyl)-2-naphthol. When R represents acetyl the compound is N,O-diacetyl-1-(2'-naphthylaminomethyl)-2-naphthol.

N-acetyl-1-(2'-naphthylaminomethyl)-2-naphthol as a pure compound may take the form of small colorless needles exhibiting a melting point of about 183° C. The compound may be prepared by the reductive acetylation of the Schiff base (2-hydroxy-1-naphthaldehyde)-beta-naphthylimine.

N,O-diacetyl-1-(2'-naphthylaminomethyl)-2-naphthol as a pure compound may take the form of small colorless rectangular prisms exhibiting a melting point of about 188°–189° C. The compound may be prepared by the acetylation of 1-(2'-naphthylaminomethyl)-2-naphthol. The latter compound is disclosed and claimed in copending application Serial No. 695,820, filed on even date herewith.

Both N-acetyl-1-(2'-naphthylaminomethyl)-2-naphthol and N,O-diacetyl-1-(2'-naphthylaminomethyl)-2-naphthol are soluble in hot n-butanol, in cold pyridine and in dilute (2%) alcoholic alkali. They are moderately soluble in hot ether and in acetone and are slightly soluble in benzene and ethanol. The compounds are insoluble in water.

The following examples illustrate methods by which compounds of this invention may be prepared:

EXAMPLE 1

N-acetyl-1-(2'-naphthylaminomethyl)-2-naphthol represented by the formula

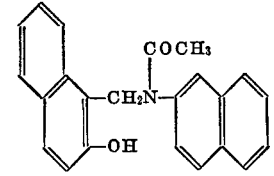

may be prepared as follows:

2 grams of the Schiff base (2-hydroxy-1-naphthaldehyde)-beta-naphthylimine were dissolved in 45 cc. of glacial acetic acid and 10 cc. of acetic anhydride and hydrogenated over Adams' platinum oxide catalyst at an initial pressure of 45 pounds per square inch. In 15 minutes the brilliant orange color of the solution had changed to nearly colorless and a molar amount of hydrogen was taken up. Shaking was continued for another 15 minutes. When the hydrogenation stopped, the catalyst was filtered off under suction, care being taken not to permit the catalyst unnecessarily to be exposed to the atmosphere and to dry during this operation in order not adversely to effect the yield. The washings were discarded. The nearly colorless filtrate was evaporated to dryness under carbon dioxide at 35°–40° C. and a pressure of one millimeter of mercury, and the residue was crystallized from n-butanol. The product was 2.00 grams of nearly colorless needles of N-acetyl-1-(2'-naphthylaminomethyl)-2-naphthol exhibiting a melting point of about 182°–183° C.

For purposes of analysis N-acetyl-1-(2'-naphthylaminomethyl)-2-naphthol prepared as above was crystallized four times from n-butanol and dried for 7 hours at 100° C. and a pressure of one millimeter of mercury. The product was pure N-acetyl-1-(2'-naphthylaminomethyl)-2-naphthol in the form of small colorless needles. For the melting point determination a sample was immersed at 180° C. and heated at a rate of 0.1° C. per ten seconds, and the compound exhibited a melting point of about 183° C.

The pure N-acetyl-1-(2'-naphthylaminomethyl)-2-naphthol which has the empirical formula $C_{23}H_{19}NO_2$ showed by microanalysis the presence of 80.63% carbon and 5.26% hydrogen as compared with the calculated values of 80.91% carbon and 5.61% hydrogen.

EXAMPLE 2

N,O - diacetyl-1-(2'-naphthylaminomethyl)-2-naphthol represented by the formula

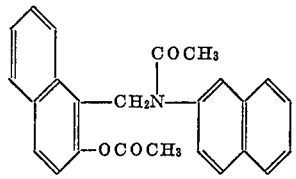

may be prepared as follows:

A solution of 2.00 grams of 1-(2'-naphthylaminomethyl)-2-naphthol in 100 cc. of pure pyridine was cooled in an ice bath to about 5° C. 5 cc. of cold acetic anhydride were added by drops, and the mixture was permitted to stand in the cold for two to three hours. The product was precipitated by the addition of water, collected, washed thoroughly with water and with two small portions of cold methanol, and dried. The yield was 2.40 grams of N,O-diacetyl-1-(2'-naphthylaminomethyl)-2-naphthol in the form of a colorless powder which exhibited a melting point of about 286°-188° C.

For purposes of analysis N,O-diacetyl-1-(2'-naphthylaminomethyl)-2-naphthol prepared as above was crystallized five times from n-butanol and dried at 80° C. under a pressure of one millimeter of mercury to give pure N,O-diacetyl-1-(2'-naphthylaminomethyl)-2-naphthol in the form of small colorless rectangular prisms exhibiting a melting point of 188°-189° C.

The pure N,O-diacetyl-1-(2'-naphthylaminomethyl)-2-naphthol which has the empirical $C_{25}H_{21}NO_3$ showed by microanalysis the presence of 78.26% carbon and 5.91% hydrogen as compared with the calculated values of 78.30% carbon and 5.52% hydrogen.

*Preparation of 1-(2'-naphthylaminomethyl)-2-naphthol*

5 grams of the Schiff base (2-hydroxy-1-naphthaldehyde)-beta-naphthylimine were dissolved in 150 cc. ethyl acetate, 0.25 gram of Adams' platinum oxide catalyst added and the compound hydrogenated at about room temperature and forty pounds per square inch pressure. One molar equivalent of hydrogen was taken up in about 20 minutes. The original deep orange color of the solution changed to a very light yellow.

The platinum catalyst was filtered off under suction, care being taken not to permit the catalyst unnecessarily to be exposed to the atmosphere and to dry during this operation in order not adversely to affect the yield. After filtering off the catalyst, the solvent was removed under vacuum with the distillation flask in a water bath maintained at 25° C. The slightly yellow crystalline residue was washed twice with small portions of cold benzene and once with hexane and dried under vacuum. There were produced 4.77 grams of 1-(2'-naphthylaminomethyl)-2-naphthol in the form of light cream colored needles. 1-(2'-naphthylaminomethyl)-2-naphthol is disclosed and claimed in copending application Serial No. 695,820 filed on even date herewith.

Since certain changes may be made in the above subject matter without departing from the scope of the invention herein involved, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

What is claimed is:

1. An N-acetyl-1-(2'-naphthylaminomethyl)-2-naphthol represented by the formula

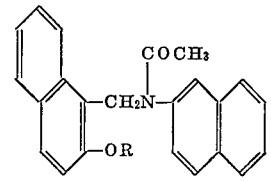

wherein R is a member of the group consisting of H and $COOCH_3$.

2. N-acetyl-1-(2'-naphthylaminomethyl)-2-naphthol being a compound which in the form of small colorless needles exhibits a melting point of about 183° C.

3. N,O-diacetyl-1-(2'-naphthylaminomethyl)-2-naphthol being a compound which in the form of small colorless rectangular prisms exhibits a melting point of about 188°-189° C.

ELKAN R. BLOUT.
RICHARD S. CORLEY.

Certificate of Correction

Patent No. 2,431,910

December 2, 1947

ELKAN R. BLOUT ET AL.

It is hereby certified that errors appear in the printed specification of the above numbered patent requiring correction as follows:

Column 3, line 29, for "286°–188° C." read *186°–188° C.*; line 39, after "empirical" insert the word *formula*; column 4, line 27, for "claim is" read *claims are*; line 43, for "COOCH$_3$" read *COCH$_3$*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*